(12) United States Patent
Shen et al.

(10) Patent No.: US 8,385,426 B2
(45) Date of Patent: Feb. 26, 2013

(54) METHOD FOR A MOSAIC PROGRAM GUIDE (75) Inventors: Richard Chi-Te Shen, Leonia, NJ (US);
Samuel O. Akiwumi-Assani, Beacon, NY (US)

(73) Assignee: Entropic Communications, Inc., San Diego, CA (US)

( * ) Notice: Subject to any disclaimer, the term of this patent is extended or adjusted under 35 U.S.C. 154(b) by 1974 days.

(21) Appl. No.: 10/537,875

(22) PCT Filed: Dec. 12, 2003

(86) PCT No.: PCT/IB03/05910
§ 371 (c)(1),
(2), (4) Date: Jun. 7, 2005

(87) PCT Pub. No.: WO2004/056098
PCT Pub. Date: Jul. 1, 2004

(65) Prior Publication Data
US 2006/0039481 A1 Feb. 23, 2006

Related U.S. Application Data (60) Provisional application No. 60/433,753, filed on Dec. 16, 2002.

(51) Int. Cl.
*H04N 7/18* (2006.01)

(52) U.S. Cl. .......... 375/240.25; 375/240.26; 375/240.13
(58) Field of Classification Search . 375/240.01–240.29
See application file for complete search history.

(56) References Cited

U.S. PATENT DOCUMENTS

| | | | |
|---|---|---|---|
| 5,900,868 A | 5/1999 | Duhault et al. | |
| 6,020,930 A | 2/2000 | Legrand | |
| 6,115,080 A | 9/2000 | Reitmeier | |
| 6,784,945 B2 | 8/2004 | Norsworthy et al. | |
| 7,480,701 B2 * | 1/2009 | Smith et al. | 709/217 |

FOREIGN PATENT DOCUMENTS

| | | |
|---|---|---|
| JP | 2001-514470 | 9/2001 |
| JP | 2001-514470 A | 9/2001 |
| JP | 2002-517959 | 6/2002 |
| JP | 2002-517959 A | 6/2002 |
| WO | WO 01 26367 | 4/2001 |
| WO | WO 01 56292 | 8/2001 |

* cited by examiner

Primary Examiner — Andy Rao
(74) Attorney, Agent, or Firm — Bruce Greenhaus; Duane Morris LLP (57) ABSTRACT A method and apparatus for generating a mosaic program guide. The method comprising; generating I frames from a coded video bit stream; placing each I frame into one of a multiplicity of mosaic windows; and combining the multiplicity of mosaic windows into a mosaic video frame.

19 Claims, 6 Drawing Sheets

METHOD FOR A MOSAIC PROGRAM GUIDE

CROSS REFERENCE TO RELATED CASES

Applicants claim the benefit of Provisional Application Ser. No. 60/433,753, filed Dec. 16, 2002.

The present invention relates to the field of digital television; more specifically, it relates to a method for generating a mosaic program guide for digital television.

A mosaic program guide consists of a combination of different video frames presented in windows on a display device such as a video monitor. Each video frame is derived from a different program, and only one video frame is displayed in each window. Generally, the video frame within each window is refreshed at some periodic rate. Mosaic program guides help viewers to preview and navigate through the numerous programs transmitted by digital television systems. However, providing mosaic program guides is costly and time consuming. One technique for generating a mosaic program guide requires simultaneous video decoding and presentation of multiple programs in multiple windows. This technique requires very fast and expensive equipment. Another technique for generating a mosaic program guide requires a service provider to generate a mosaic guide and then deliver the mosaic program guide as a single program that appears to be broken into windows. This places additional cost on the service provider in terms of equipment and human resources as well as using up bandwidth that could otherwise be used for programs. When several hundred programs are available, this is not a trivial undertaking on the service providers part.

Therefore, there is a need for a method of generating a mosaic program guide with minimum additional cost.

A first aspect of the present invention is a method of generating a mosaic program guide comprising; generating I frames from a coded video bit stream; placing each I frame into one of a multiplicity of mosaic windows; and combining the multiplicity of mosaic windows into a mosaic video frame.

A second aspect of the present invention is an apparatus for generating a mosaic program guide comprising: means for generating I frames from a coded video bit stream; means for placing each I frame into one of a multiplicity of mosaic windows; and means for combining the multiplicity of mosaic windows into a mosaic video frame.

A third aspect of the present invention is a receiver for generating a mosaic program guide comprising: means for receiving an input signal and generating a coded bit stream; a de-multiplexer adapted to receive the coded bit stream and adapted to generate a coded video bit stream; a video decoder adapted to select I frame data from the coded video bit stream and decode and generate a sequence of I frames.

A fourth aspect of the present invention is a receiver for generating a mosaic program guide comprising: a first tuner and demodulator adapted to receive an input signal and adapted to generate a first coded bit stream; a first a de-multiplexer adapted to receive the first coded bit stream and adapted to generate a first coded video bit stream; a first video decoder adapted to receive the first coded video bit stream and generate a sequence of video frames from a single program; a second tuner and demodulator adapted to receive the input signal and adapted to generate a second coded bit stream; a second de-multiplexer adapted to receive the second coded bit stream and adapted to generate a second coded video bit stream; and a second video decoder adapted to select I frame data from the second coded video bit stream and decode and generate a sequence of I frames.

The features of the invention are set forth in the appended claims. The invention itself, however, will be best understood by reference to the following detailed description of an illustrative embodiment when read in conjunction with the accompanying drawings, wherein:

The term frame is interchangeable with the term picture when used in the context of video images. The term I frame (intra frame) is defined as a frame of video that is coded using prediction only from decoded samples within the same frame. The term P frame (predictive frame) is defined as a frame of video data coded using inter prediction from previously decoded reference frames, using motion vectors. The term B frame (bi-directional predictive frame) is defined as a frame coded using multiple inter prediction blocks. A block is an N×M array of samples or transform coefficients. A program guide is defined as a mosaic of scaled frames from different programs arranged in a pattern. Scaling is defined as a process of modifying a video frame to change relationship between the number of display device pixels and the number of pixels of a video frame, according to an algorithm, using all or a subset of the pixels of the video.

Figure 1:
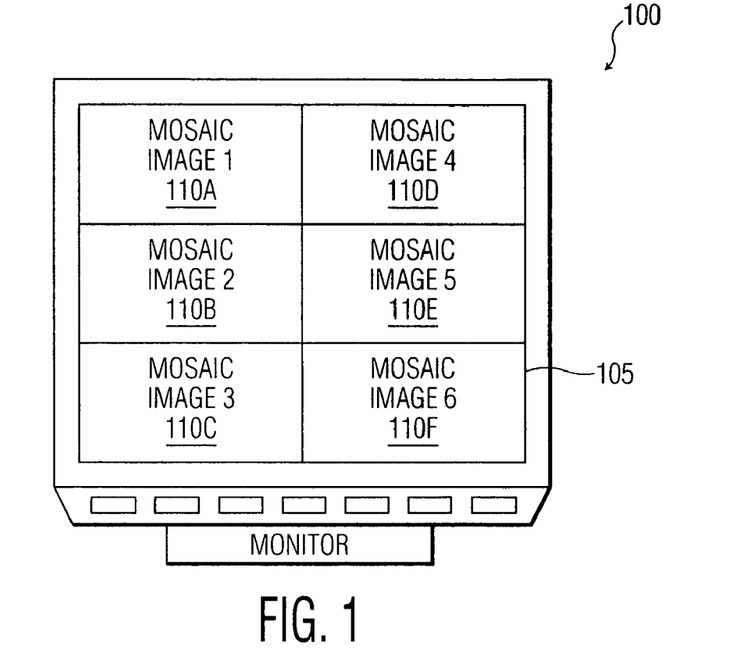
FIG. 1 is an illustration of a display device displaying a mosaic program guide according to the present invention.

FIG. 1 is an illustration of a display device displaying a mosaic program guide according to the present invention. In FIG. 1, a display device 100 includes a screen 105 subdivided into mosaic windows 110A, 110B, 110C, 110D, 110E and 110F. In one example, display device 100 is a television monitor. In a second example, display device 100 is a projector projecting mosaic windows 110A through 110F onto screen 105. Within each mosaic window 110A through 110F a corresponding different mosaic image 1 through 6 is displayed. Each mosaic image 1 through 6 is, for example, a video frame from a different program. Mosaic images 1 through 6 may be updated periodically. Mosaic images 1 through 6 may be considered as constituting a program guide of six programs, allowing a viewer to sample the six programs before deciding which program to view. While six mosaic images are illustrated, any number of mosaic images in any geometric arrangement of windows may be displayed.

Figure 2:
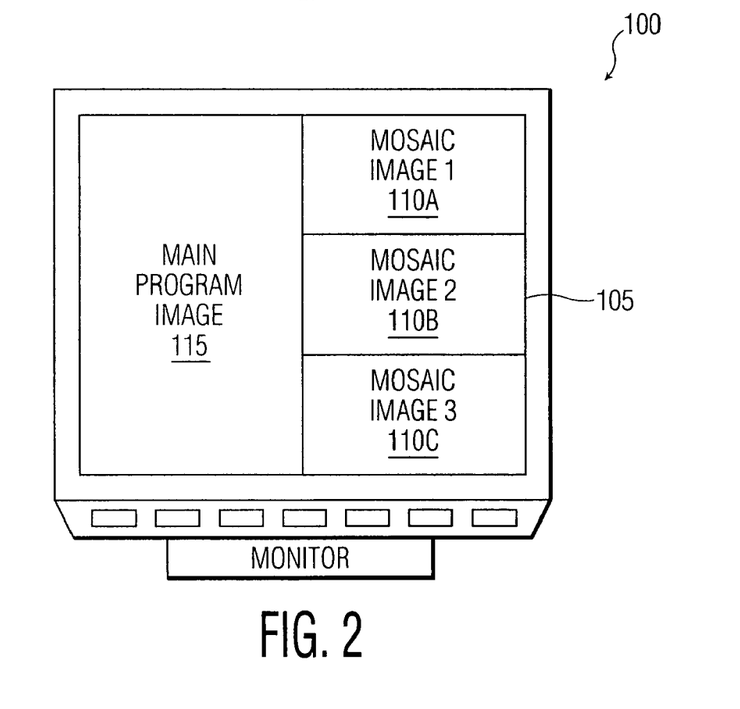
FIG. 2 is an illustration of a display device displaying a mosaic program guide and a main program according to the present invention.

FIG. 2 is an illustration of a display device displaying a mosaic program guide and a main program according to the present invention. In FIG. 2, window 105 of display device 100 is subdivided into mosaic windows 110A, 110B, 110C and main window 115. Mosaic windows 110A through 110C display mosaic images 1 through 3, respectively. Mosaic images 1 through 3 are video frames from different programs. Main window 115 displays a main program image, which is, at any instant of time, a video frame of a program being viewed. The main program image is refreshed at normal rates and is accompanied by corresponding audio. Generally, the mosaic images 1 through 3 are refreshed at a slower than normal rate. While three mosaic images are illustrated, any number of mosaic images in any geometric arrangement of windows may be displayed.

Figure 3:
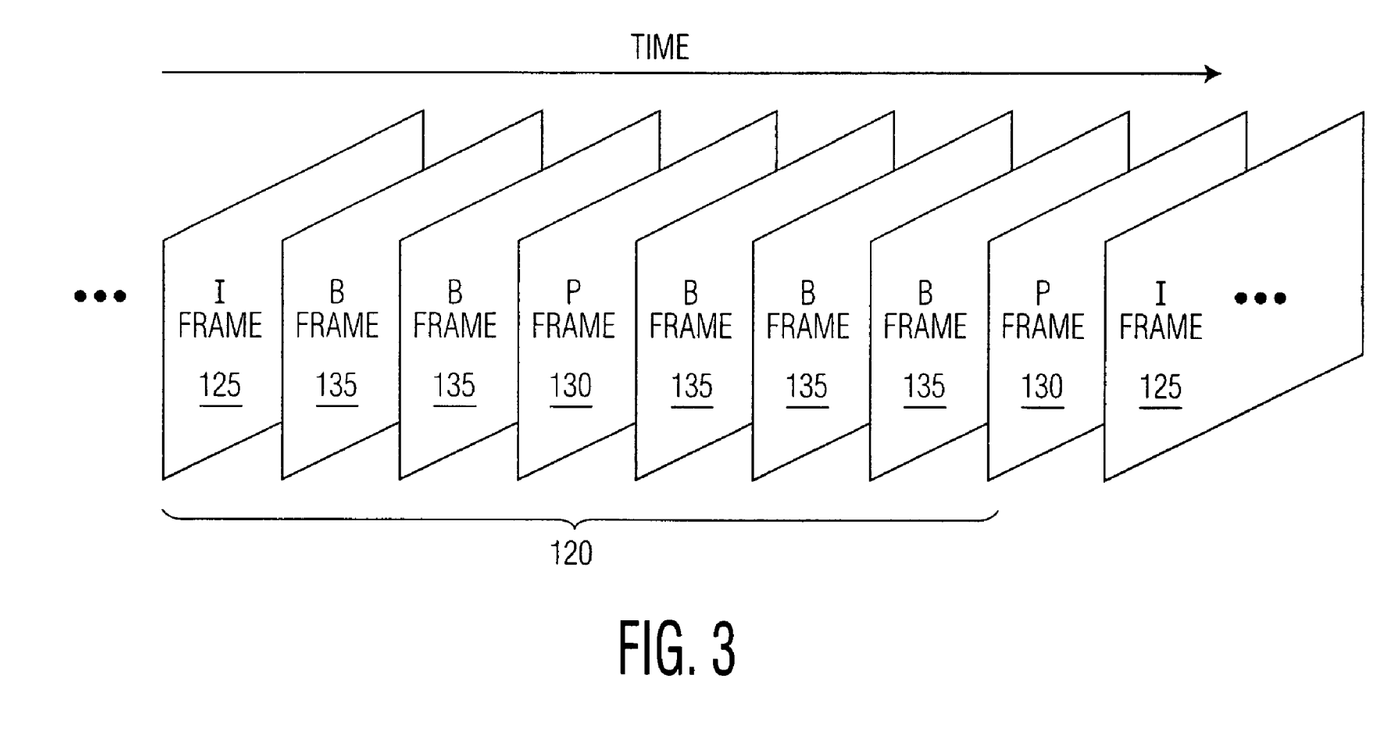
FIG. 3 is a diagram illustrating video a typical sequence of video frames that are encoded into a digital data stream.

FIG. 3 is a diagram illustrating a typical sequence of video frames that are encoded into a digital data stream. A digital data stream, such as the transport stream of the motion pictures experts group (MPEG) is comprised of digital data (along with other data, such as audio data) representing a temporal sequence of video frames of different types. Only the video frame sequence is illustrated in FIG. 3. In FIG. 3, a portion of a temporal sequence of video frames 120 includes I frames 125, P frames 130 and B frames 135. Each program in a transport stream includes its own I, P, and B frames. The main program image displayed in window 115 of FIG. 2 requires the decoding and presentation of all I frames 125, P frames 130 and B frames 135 belonging to a single program (i.e the main program). Mosaic images displayed in mosaic windows 110A through 110F of FIG. 1 and mosaic windows 110A through 110C of FIG. 2 are decoded and presented I frames 125 from different programs. I frames are used because they do not require decoding of any other frames in order to have a complete frame. Further, the amount of decoding required is less since I frames are not compressed as much as P or B frames. Therefore, in the present invention, the mosaic images are generated in the receiver and not by the service or content provider and are not complete video programs but samples.

Figure 4:
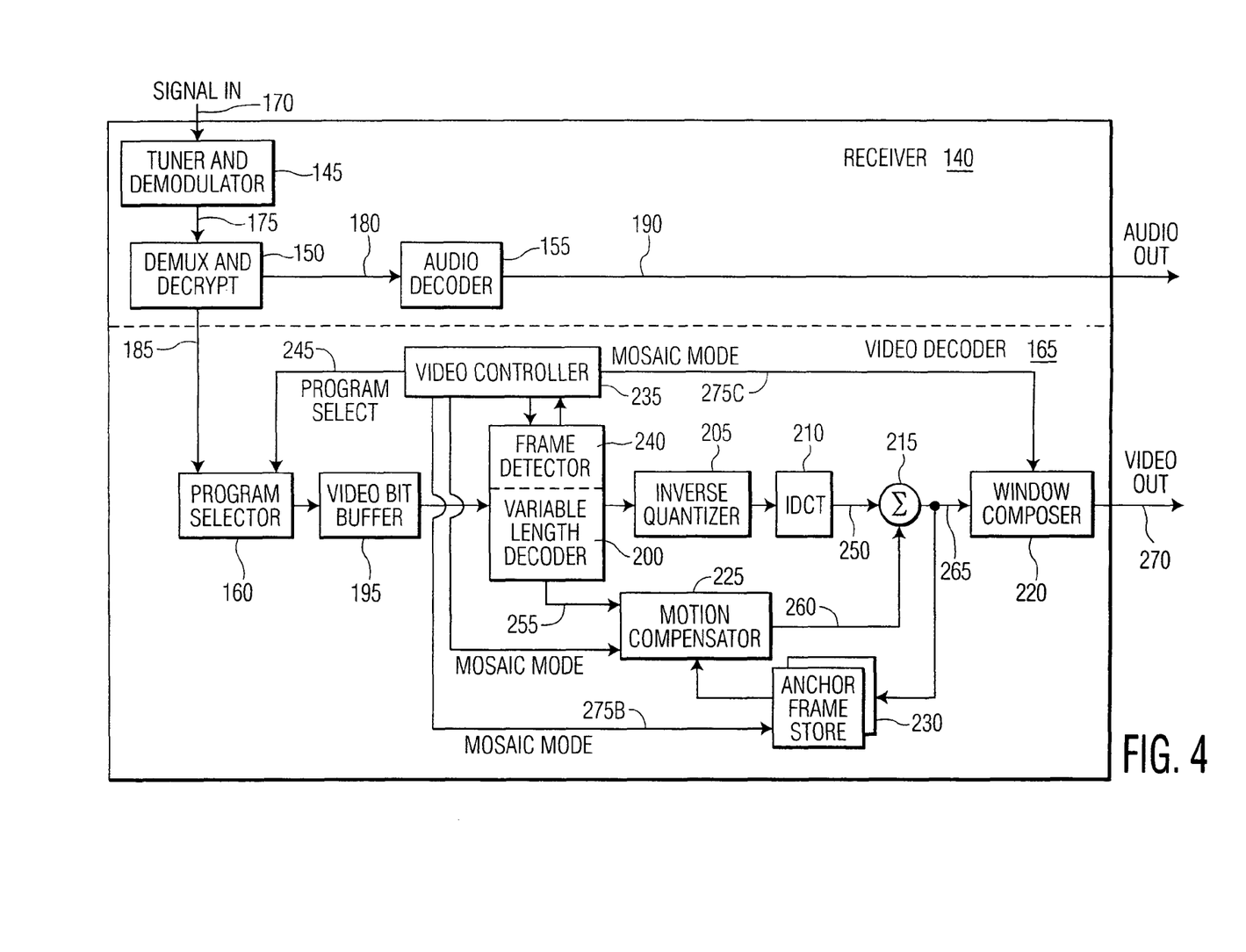
FIG. 4 is a schematic block diagram of a receiver for generating a mosaic program guide according to the present invention.

FIG. 4 is a schematic block diagram of a receiver for generating a mosaic program guide according to the present invention. In FIG. 4, receiver 140 includes a tuner and demodulator 145, a de-multiplexer and decryptor 150, an audio decoder 155 and a video decoder 165. Tuner and demodulator 145 receives an input signal 170 and generates a coded bit stream 175 (for MPEG a transport stream). De-multiplexer and decryptor 150 receives code bit stream 175 and generates a coded audio bit stream 180 (for MPEG an audio elementary stream) and a coded video bit stream 185 (for MPEG, a video elementary stream). Audio decoder 155 receives coded audio bit stream 180 and generates a playable audio out signal 190.

Video decoder 165 includes a program selector 160, a video bit buffer 195, a variable length decoder (VLD) 200, an inverse quantizer 205, an inverse discrete cosine transformer (IDCT) 210, a reconstructor 215, a window composer 220, a motion compensator 225, an anchor frame storage 230 and a video controller 235. VLD 200 further includes a frame detector 240. Coded video bit stream 185 passes through program selector 160 and into video bit buffer 195. Program selector 160 allows selection of specified channels. Video bit buffer 195 prevents overloading video decoder 165.

For normal operation (i.e. playing a main program), video controller 235 selects programs via a program select signal 245 and video bit buffer 195 receives coded video bit stream 185, and passes the coded video bit stream in temporally buffered bursts of data to VLD 200. VLD 200, along with inverse quantizer 205 and IDCT 210 generate pixel data 250 (either an I frame in the case of an I frame or pixel by pixel prediction errors in the case of P frames or B frames) degraded by quantization. VLD 200 also generates motion vectors 255 which are received by motion compensator 225 which generates motion compensated predicted pixels 260 from motion vectors 255 and pixels in anchor window composer 230. Reconstructor 215 combines pixel data 250 and motion compensated predicted pixels 260 into reconstructed pixels 265. Reconstructed pixels 265 are passed to window composer 220 and anchor window composer 230. Window composer 220 composes reconstructed pixels 265 for display and generates a displayed video out signal 270. In normal mode, window composer 220 simply generates one "full screen" window and fills the display space with one frame (at a time).

Figure 5:
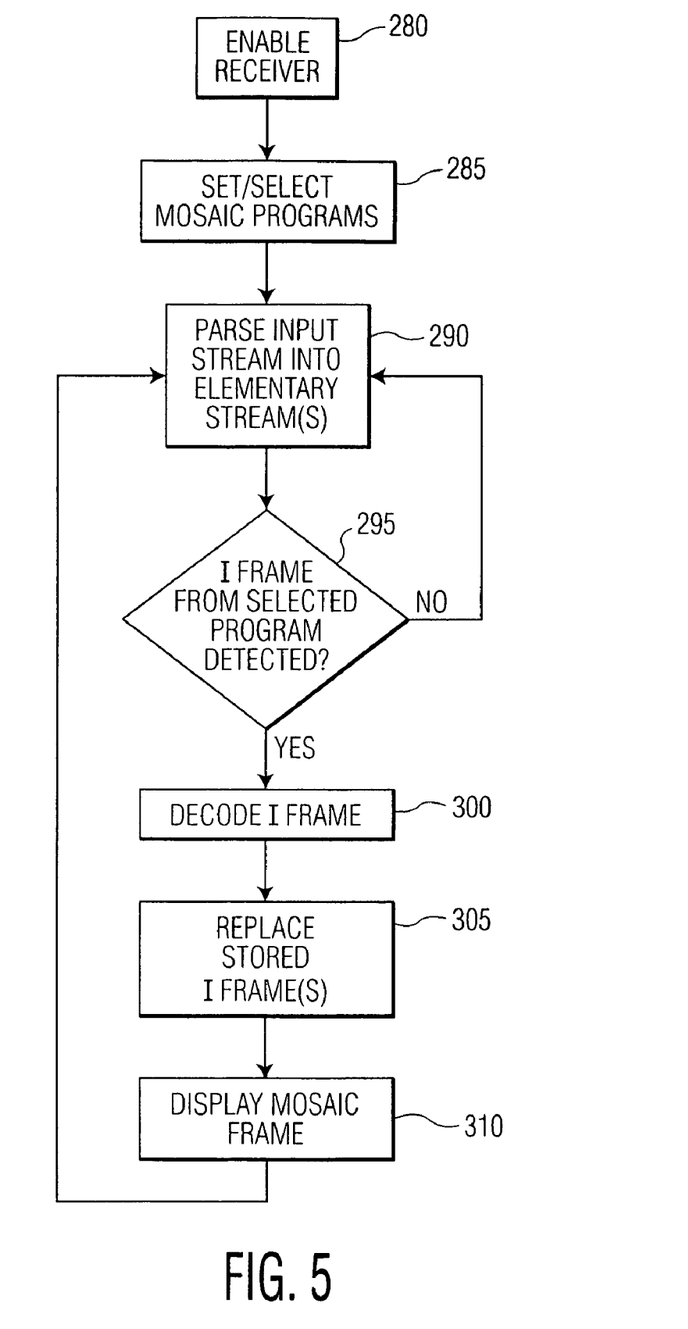
FIG. 5 is a flowchart illustrating the method steps for generating a mosaic program guide according to the present invention.

For mosaic operation (i.e. displaying a program guide as illustrated in FIG. 5), video controller 235 selects channels via channel select signal 245 and video bit buffer 195 receives coded video bit stream 185, and passes the coded video bit stream in temporally buffered bursts of data to VLD 200. When frame detector 240 detects an I-frame video, controller 235 sends a mosaic mode signal 275A to motion compensator 225 to turn motion compensation off, a mosaic mode signal 275B to anchor frames storage to disable receiving reconstructed pixels 265 and mosaic mode signal 275C to window composer 220 to place the window composer in mosaic mode (e.g. scale I frames and place I frames into multiple windows). When frame detector 240 detects a P frame or B frame, video controller 235 instructs VLD 200 to ignore the frame and no data is passed out of the VLD. Thus, pixel data 250 will contain only I frames. In mosaic mode, window composer 220 scales each frame of a different program to fill one mosaic window, assembles the windows into a mosaic frame and presents the mosaic frame to the video display device. Window composer 220 stores each I frame and replaces older I-frames from each program with newer I frames from each program so the mosaic frame is constantly updated. Thus, the mosaic frame is used to refresh the display device, while the mosaic frame itself is updated as new I frames are received.

Video decoder 165 can operate in mixed mode (as illustrated in FIG. 2) by allowing decoding of P frames and B frames of a selected program while blocking decoding of P frames and B frames of all other programs, and appropriate switching of mosaic mode control signals 275A, 275B and 275C. In mixed mode, window composer 220 scales each frame of a different program to fill one mosaic window and scales the fully decoded video program to fit into a main window.

FIG. 5 is a flowchart illustrating the method steps for generating a mosaic program guide according to the present invention. In step 280, the receiver is enabled and an input signal is received. In step 285 the receiver is set to mosaic mode and programs to include in the mosaic program guide are selected. In step 290, the input signal is de-multiplexed (and decrypted if necessary) into an elementary video stream. In step 295, it is determined if an I-frame has been detected, and if so, if the detected I frame belongs to a program selected for display in the video guide. If the detected frame is not an I-frame (for example a P frame or a B frame), or is an I frame from a non-selected program, then the method loops back to step 290. If the detected frame is an I frame from a selected program then in step 300 the I frame is decoded. Next in step 305, each program's last decoded and stored I frame is replaced with each program's latest decoded I frame and the mosaic frame is updated. In step 310, the mosaic frame is displayed and refreshed as required. The method continuously loops back to step 290.

Figure 6A:
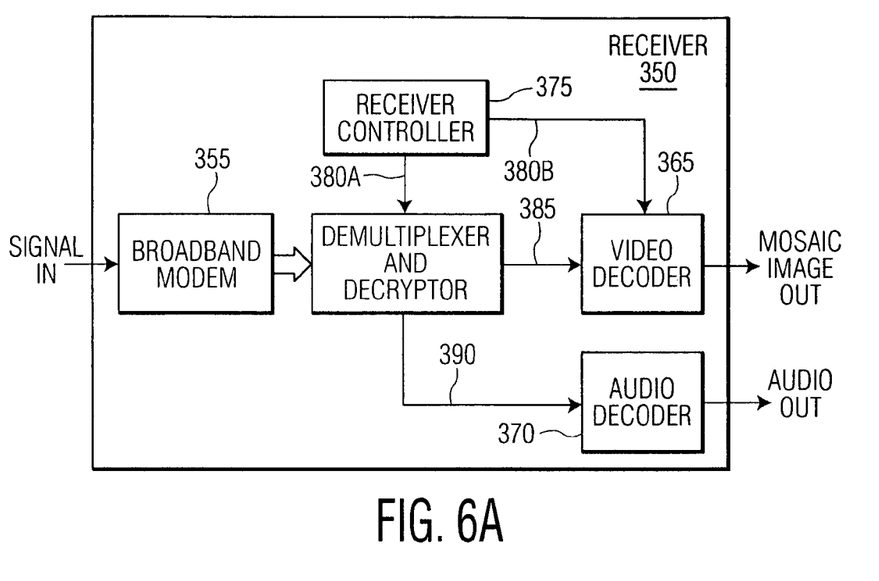
FIG. 6A is a schematic block diagram of a first application of the present invention.

FIG. 6A is a schematic block diagram of a first application of the present invention. In FIG. 6A, a receiver 350 includes a broadband modem 355 (or a standard modem), a de-multiplexer and decryptor 360, a video decoder 365, an audio decoder 370 and a receiver controller 375. Video decoder 365 is identical to video decoder 165 illustrated in FIG. 4 and described supra. De-multiplexer 360 receives a broadband coded bit signal from broadband modem 355, and in response to control signal 380A selects which broad band signals to compose into video elementary stream 385 and audio elementary stream 390. Audio decoder 370 receives audio elementary stream 390 and generates a playable audio out signal. Video decoder 365 receives video elementary stream 385 and in response to a control signal 380B generates a series of decoded I frames for display.

Figure 6B:
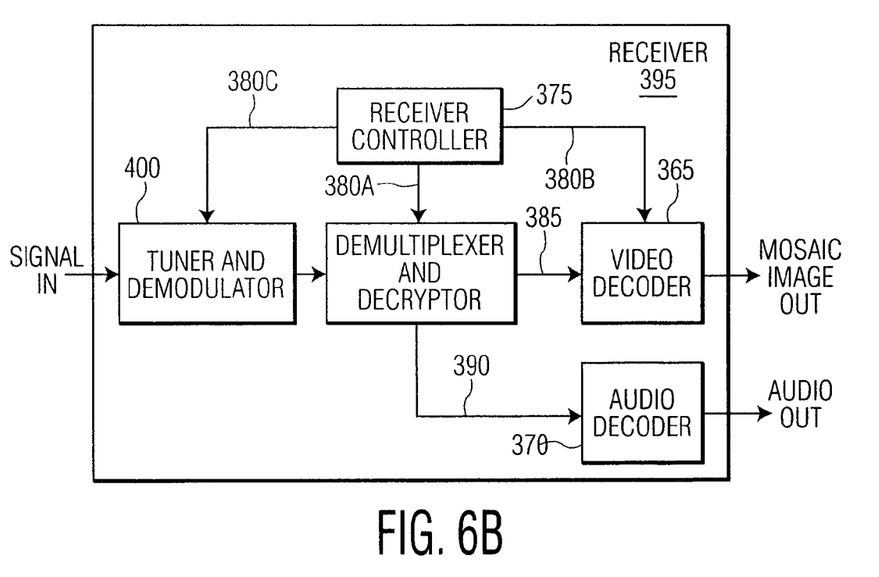
FIG. 6B is a schematic block diagram of a second application of the present invention.

FIG. 6B is a schematic block diagram of a second application of the present invention. In FIG. 6B, a receiver 395 is similar to receiver 350 illustrated in FIG. 6A except broadband modem 355 (see FIG. 6A) is replaced with a radio frequency (RF) tuner and demodulator (or simply an RF tuner) 400 which generates coded bit stream (for MPEG, a transport stream) and de-multiplexer and decryptor and decryptor 360 is replaced with de-multiplexer and decryptor 360A. De-multiplexer and decryptor 360A need not have the capacity of de-multiplexer and decryptor 360 because a control signal 380C is provided from receiver controller 375 to select output from tuner and demodulator 400. Video decoder 365 receives video elementary stream 385 and in response to a control signal 380B generates a series of decoded I frames for display.

Figure 6C:
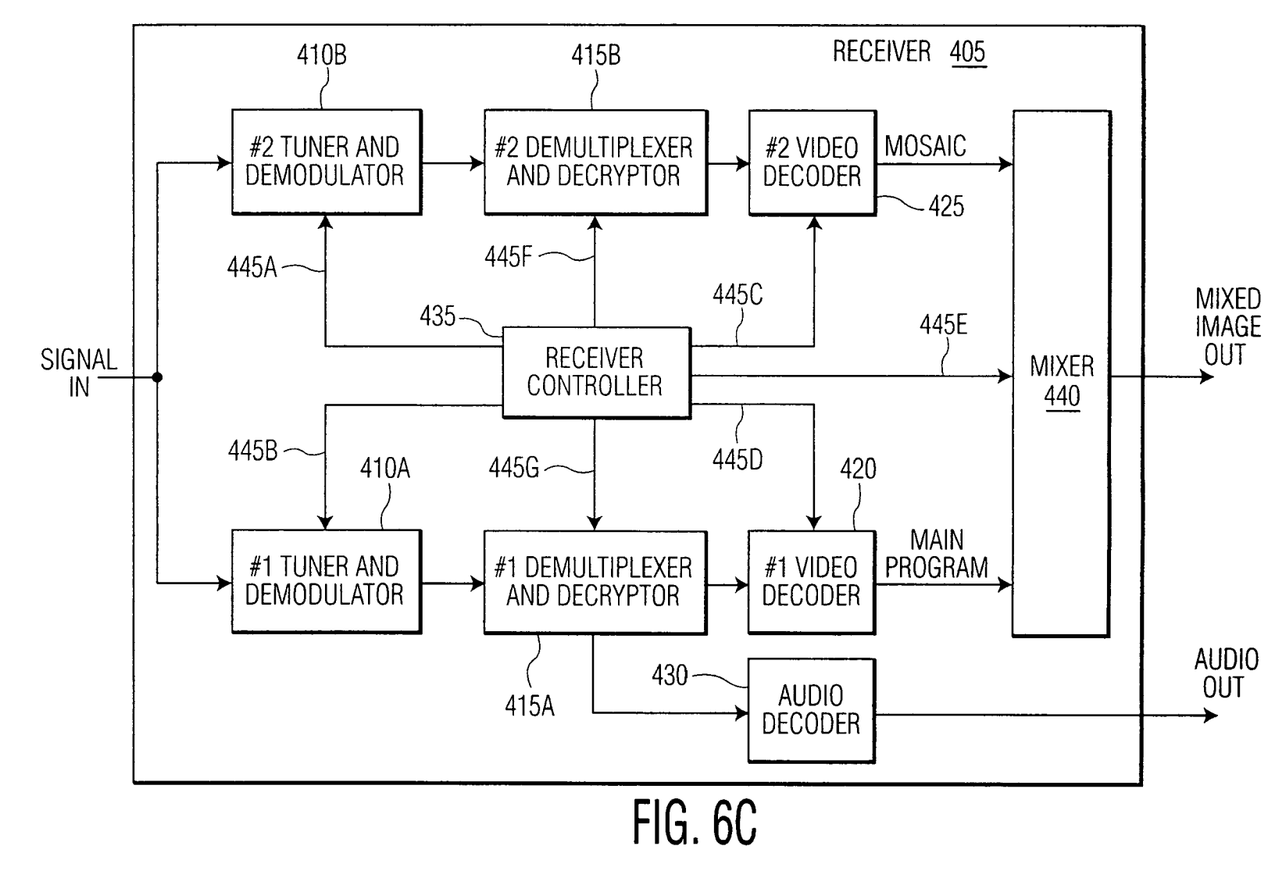
FIG. 6C is a schematic block diagram of a third application of the present invention.

FIG. 6C is a schematic block diagram of a third application of the present invention. In FIG. 6A, a receiver 405 includes first and second RF tuner and demodulators 410A and 410B, first and second de-multiplexers and decryptor 415A and 415B, a first video decoder 420, a video decoder 425, an audio decoder 430, a receiver controller 435 and a mixer 440. First video decoder 420 is identical to video decoder 165 illustrated in FIG. 4 and described supra. Second video decoder 425 is similar to video decoder 165 illustrated in FIG. 4 and described supra except that the second video decoder need not contain a motion compensator or anchor frame storage and the decoder may be modified to recognize and decode only I-frames. First and second tuner and demodulators may or may not be identical and first and second de-multiplexers and decryptor 415A and 415B may or may not be identical In operation first tuner and demodulator 410A, first de-multiplexer and decryptor 415A, and first video decoder 420 together generate and present all video frames of a main program to mixer 440. Second tuner and demodulator 410B, second de-multiplexer and decryptor 415B, and second video decoder 425 together generate and present all I frames of a selected program guide (mosaic) programs to mixer 440. Mixer 440 then scales each mosaic frame and main frame to fit corresponding windows with a single frame, assembles the scaled frames into a single displayable frame.

Receiver 405 can also produce normal video and mosaic only mode video via appropriately applied control signals 445A, 445B, 445C, 445D, 445E, 445F and 445G. The present invention is applicable to all digital communications standards using I frames, P frames and B frames, including but not limited to MPEG-1, MPEG-2, MPEG-4, MPEG-7, International telecommunications Union Standardization Sector (ITU-T) H264, digital satellite system (DSS) data structures or other standards that share common data stream structures with or are built upon the MPEG standard. In the case of ITU-T H264 standard, an additional type of frame, an SP frame is allowed. SP frames are ignored, similarly to P frames and B frames when the invention is in mosaic or program guide mode.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

The invention claimed is:

1. A method of generating a mosaic program guide in a receiver, the method comprising:
   generating, by a video decoder of a receiver, I frames from a coded video bit stream;
   placing, by the receiver, each I frame into one of a multiplicity of mosaic windows; and
   combining, in the receiver, said multiplicity of mosaic windows into a mosaic video frame.

2. The method of claim 1, further including scaling each I frame to fit into one of said mosaic windows.

3. The method of claim 1, wherein each mosaic window is associated with a different program.

4. The method of claim 3, wherein the I frame of each mosaic window is replaced with a later decoded I frame of the same program.

5. The method of claim 4, wherein said later decoded I frame is the next I frame of the same program.

6. The method of claim 1, further including selecting programs for which said I frames are generated.

7. The method of claim 1, wherein said generating I frames includes:
   selecting from a coded video bit stream coded data, said coded data representing I frames; and
   decoding and decompressing said coded data into said I frames.

8. The method of claim 1, further including:
   generating a set of video frames from a selected program from said coded video bit stream; and
   sequentially scaling and placing each video frame of said set of video frames into a selected mosaic window of said multiplicity of mosaic windows.

9. The method of claim 1, further including displaying said mosaic frame on a display device.

10. An apparatus for generating a mosaic program guide comprising:
    means for generating I frames from a coded video bit stream;
    means for placing each I frame into one of a multiplicity of mosaic windows; and
    means for combining said multiplicity of mosaic windows into a mosaic video frame.

11. The apparatus of claim 10, further including means for scaling each frame to fit into one of said mosaic windows.

12. The apparatus of claim 10, wherein each mosaic window is associated with a different program.

13. The apparatus of claim 12, wherein the I frame of each mosaic window is replaced with a later decoded I frame of the same program.

14. The apparatus of claim 13, wherein said later decoded I frame is the next I frame of the same program.

15. The apparatus of claim 10, further including means for selecting programs for which said I frames are generated.

16. The apparatus of claim 10, wherein said means for generating I frames includes:
    means for selecting from a coded video bit stream coded data, said coded data representing I frames; and
    means for decoding and decompressing said coded data into said I frames.

17. The apparatus of claim 10, further including:
    means for generating a set of video frames from a selected program from said coded video bit stream; and means for sequentially scaling and placing each video frame of said set of video frames into a selected mosaic window of said multiplicity of mosaic windows.

18. A receiver for generating a mosaic program guide comprising:
- means for receiving an input signal and generating a coded bit stream;
- a de-multiplexer adapted to receive said coded bit stream and adapted to generate a coded video bit stream;
- a video decoder adapted to select I frame data from said coded video bit stream and decode and generate a sequence of I frames.

19. The receiver of claim 18 wherein said means for receiving an input signal is selected from the group of devices consisting of modems, broadband modems, RF tuners and RF tuners and demodulators.

* * * * *